Aug. 7, 1962 D. B. PALL ET AL 3,048,537
POROUS ARTICLES OF POLYETHYLENE POLYMERS AND
PROCESS OF MAKING THE SAME
Filed Jan. 6, 1958

INVENTORS.
DAVID B. PALL &
SIDNEY KRAKAUER
BY
their ATTORNEYS.

United States Patent Office
3,048,537
Patented Aug. 7, 1962

3,048,537
POROUS ARTICLES OF POLYETHYLENE POLYMERS AND PROCESS OF MAKING THE SAME
David B. Pall, Roslyn Heights, and Sidney Krakauer, Franklin Square, N.Y., assignors to Pall Corporation, Glen Cove, N.Y., a corporation of New York
Filed Jan. 6, 1958, Ser. No. 707,288
13 Claims. (Cl. 210—510)

This invention relates to a process for preparing porous articles of manufacture of polyethylene and to the articles thus obtained, and, more particularly, to a process of preparing porous polyethylene articles which are nonporous in selected areas.

Polyethylene has come into wide use in recent years because of its low cost and outstanding properties as a plastic. It is tough, flexible at low temperatures, form-stable up to temperatures quite close to its softening temperature, and is resistant to most solvents and organic chemicals. In addition, it is nontoxic, odorless and tasteless. These properties have adapted it for wide use as tank and pipe linings, coatings for paper, wood, metal and fabric, wires, sheeting and films, washers, packings and gaskets, to mention but a few. These same properties would also make it outstanding for porous articles such as filters and bearings. It has however been practical to prepare porous articles only drilling holes in sheets and blocks of polyethylene. The preparation of porous articles by sintering polyethylene particles has not been possible by the usual methods.

In the preparation of porous articles from thermoplastic synthetic resins, the customary procedure is to grind the resin to a suitably finely-divided powder, and this is precompressed at high pressures, of the order of 1500 p.s.i. or higher, in the shape desired. The shaped compress is brought to sintering temperature in an oven without confinement. In the case of most resins, the compacting produces an article which retains its form sufficiently to permit handling and sintering to the final product. However, it has not been possible to prepare porous articles of polyethylene in this way. Polyethylene is not susceptible to compacting at high pressures. When subjected to such pressures, it does not acquire a degree of cohesiveness so that the particles retain the compressed shape.

Recently, a new type of polyethylene has become available having a higher density than the older forms. This material can be precompacted to form an article, and this will retain a shape until sintered. However, it will shrink greatly during sintering, and the amount of shrinking will vary in various portions of the article. Thus, during sintering the dimensions are not maintained, and the final product obtained will not have a shape corresponding to the die. Moreover, it is not possible to maintain uniform porosity in the finished article.

It has now been found that porous articles can be prepared from low density polyethylene, by sintering a layer of particles under moderate pressure sufficient to take up the natural slight shrinkage of the particles during sintering and at the same time compress the layer just a little to minimize shifts of position of the particles while they are soft. A layer of polyethylene particles is confined between inert nonadhering surfaces and brought to a temperature above the softening point but below the melting or decomposition point of the particles while applying to the layer through a surface a pressure within the range from about 10 to about 50 pounds per square inch (p.s.i.) In the course of the process the particle layer is confined to uniform dimensions and its volume or thickness is reduced in one dimension. The density increases as the softened particles shrink and are brought into adhesive contact with each other. When the temperature is brought below the softening point of the polymer, the mass is hardened to a network of united particle aggregates whose porosity is dependent in part upon the extent to which the particle mass is reduced in dimensions and in part upon the size of the particles used to form the layer.

Application of moderate pressure during sintering holds the particles in position, takes up their natural slight shrinkage during sintering and also prevents any shift in position while they are soft. At the same time, the pressure is not sufficient greatly to compress the layer. The layer of particles will be reduced in thickness during sintering only from about one quarter to about three-quarters of its original thickness, of which more than half is due to shrinkage.

The surfaces through which pressure is exerted upon the particle layer can be plane surfaces or of any desired configuration, and at the conclusion of the process a porous article is obtained whose external surface configuration corresponds to that of the confining surfaces.

It is possible in accordance with the invention to prepare porous articles having selected nonporous areas. This is done by using confining surfaces of appropriate raised-and-recessed waffle-like or hill-and-dale configuration, or by sintering layers of nonuniform density or nonuniform thickness between plain or flat confining surfaces or surfaces of other configurations. Thus, during sintering those areas which are subjected to the greatest degree of compression will be rendered nonporous, while the remaining areas will receive less pressure, insufficient to render them nonporous, but nonetheless will be united into aggregates forming a porous structure.

Polyethylene is a poor heat conductor and also has the property of remaining substantially dimensionally stable at temperatures just below its softening temperature. If therefore a relatively thick or deep layer is to be sintered, the heating rate must be slow, so that all particles are brought to sintering temperature at about the same time. But this low heat conduction can be used to advantage, also. If a thick layer is heated quickly through the surfaces to the sintering temperature, the particles in the inner portions of the layer removed from the surfaces will not have been heated to the sintering temperature. Thus, it is possible to sinter only the external surface particles to form a porous skin while the particles remaining in the interior remain nonsintered. By this method a layer of nonsintered particles is sealed in or confined by a skin of porous polyethylene.

This procedure has the additional advantage of not requiring as much powder, because the loss of volume due to shrinkage during sintering is less, less of the particle layer having been sintered, while the inside of the particle layer has a greater porosity as well as a greater volume of open area between the particles. Such a skin-sintered article has an interior which can serve as a reservoir for fluid from which liquid can be removed by compressing the object or by capillary action.

Microscopic examination of the sintered porous areas of porous articles in accordance with the invention has shown that the distribution of the pores is uniform from one face to the other. The flow capacity of the articles sufficiently porous to serve as filters is quite high.

Figure 1:
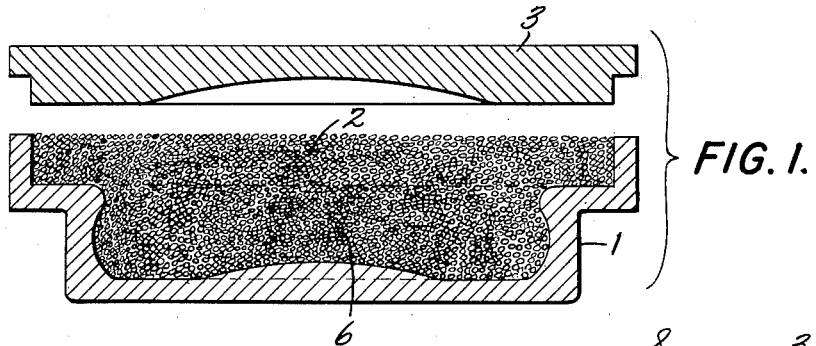
FIGURE 1 shows in cross section a loaded mold for making a porous bottle cap.

The method of forming porous articles of the invention will now be described in greater detail. A layer of polyethylene particles is spread upon one of the confining surfaces in the desired height per unit area of surface, measured at right angles to the surface in the direction of pressing. The height chosen takes into account shrinkage and compression during sintering. Any areas selected to be nonporous can be tamped if desired and more particles added. The other confining surface then is brought to bear upon the layer, and pressure applied within the range from 10 to 50 p.s.i. without compressing or compacting the layer to any appreciable extent until the layer is heated. As the particles become soft and shrink the confining surfaces approach each other more closely, until eventually the limiting gap is reached. The limiting gap is established at the thickness of the finished article by stops attached to the apparatus limiting the thrust of the confining surfaces to the desired gap therebetween. Sintering is continued at the desired temperature and pressure until adhesion of the particles to each other is complete. The layer, now a finished unitary mass, then is cooled until hard and the finished article removed.

Quenching the confining surfaces will expedite cooling of the article, but this is not necessary.

Conventional molding equipment can be used, but the confining surfaces should be inert and nonadhering. The surfaces as stated can be flat or plain or can have any desired regular configuration and can be provided with raised and/or recessed portions.

The process of the invention is applicable to any low density polyethylene which can be softened and/or fused by heat without decomposition. Low density polyethylenes have a density within the range from 0.91 to 0.93. Such polyethylenes are distinguished from the high density polyethylenes which have a density in excess of 0.93, and which cannot be processed in accordance with the invention because they shrink excessively. Low density polyethylene is characterized by the following physical properties:

| | |
|---|---|
| Density | 0.91–0.93 |
| Hardness (Shore D) | 40–50 |
| Stiffness modulus, p.s.i. | 10–25,000 |
| Tensile strength, p.s.i. | 1500–2000 |
| Elongation, percent | 200–550 |
| Resistance to heat, °F | 212 |

Low density polyethylene does not have a true melting point, but undergoes a transition from its solid phase to a soft adhesive state at temperatures within the range from 225° to 235° F., and retains this consistency more or less, without becoming liquid, up to much higher temperatures. Thus, low density polyethylene can be formed into porous articles in accordance with the invention by heating layers of particles thereof to temperatures within the range from about 225° to about 350° F., preferably about 280° to about 350° F. These temperatures may vary somewhat with individual samples of the resins, since they are dependent upon the degree of polymerization of the resin. In general, oven or mold temperatures can be somewhat higher, within the range from about 280 to about 400° F., depending upon the polymer. In cases where the molds are of great mass, over thirty times that of the resin, oven temperatures can be as high as 650° F. It is essential, however, that the particle form not be lost, as would occur if the resin liquefied, or that the resin decompose.

Porous articles can be formed from resins of any particle size. The particle size is not critical, but the larger the particle size the greater the pore size of the article obtained, and correspondingly, the greater the permeability. For optimum results the particles should pass a 30 to 100 mesh screen. Depending upon particle size, the porosity will range from micropores, of the order of 5 to 100μ average diameter, to macropores, greater than 0.001 inch, up to 0.01 inch average diameter. All of these are of microscopic dimensions.

The thickness of the layer will depend upon the desired thickness of the porous article. The thickness of the layer will be reduced during sintering, due to compression and shrinkage. This reduction will range from one-tenth to one-half of the thickness of the article. As thickness increases, the rate of heating during sintering becomes more important. If it is desired to sinter all of the particles in the layer, the rate of heating should be slow and uniform, of the order of 15 to 25° F. per minute, for ⅛ to ¼ inch thick layers, inasmuch as polyethylene is a poor heat conductor. However, if it is desired to sinter only the exterior portions of the layer, the rate of heating should be quite rapid, of the order of 80 to 150° F. per minute, so that the outer particles will be sintered to form a skin before the inner particles are hot enough to soften. In general, layers of thickness up to about ¼ inch are readily sintered throughout even when using rapid rates of heating, and readily yield articles of uniform permeability. Layers of greater thickness are sintered uniformly only using slower rates of heating, and sintered incompletely using rapid rates of heating to yield articles composed of a skin of sintered polyethylene enclosing nonsintered polyethylene particles.

The greater the reduction in thickness, the lower the permeability and pore size of the article, and the greater its tensile strength. When the thickness of the layer is reduced by approximately one-eighth up to one-quarter, a satisfactory comprise between permeability and tensile strength is obtained.

Articles of any desired percentage of voids and pore size per unit area can be prepared by an appropriate selection of particle size and reduction in thickness of the particle layer. These conditions likewise are not critical, but will be chosen to meet the particular need. Usually the product has up to 75% voids.

In preparing a nonporous area using plane confining surfaces, the density of the layer is important. There should be a sufficient number of particles in the area which is to be nonporous to effect a complete fusion of the particles in that area during sintering, under the same conditions of heat and pressure at which a porous structure is formed elsewhere in the filter. The number of particles, i.e., the particle density, in the areas to be nonporous can be increased relative to the porous areas by tamping such areas of the layer under moderate pressure and then adding more particles to the tamped areas. The tamping can be repeated one or more times, as necessary to increase particle density to a point at which the tamped area will be nonporous after sintering.

It is possible by this method to produce filters having nonporous and porous areas at different levels, and either the nonporous or the porous areas can be raised relative to each other, by using confining surfaces having raised and/or recessed portions. If flat confining surfaces are used, the porous and nonporous areas of course will be at the same level.

Alternatively, a layer can be prepared in which the areas are of nonuniform thickness initially, the layer being thickest in the areas which are to be nonporous. This alternative procedure requires that areas of different thickness be built up. Since these areas are composed of particles which collectively have no dimensional stability and tend to flow upon each other, it is not as well adapted to produce filters with sharply defined porous and nonporous areas, whereas the tamping method is adapted to produce such filters.

In another alternative procedure, the layer can be of uniform thickness and is sintered while confining the layer between surfaces having raised and/or recessed waffle-like or hill-and-dale portions, so that under a given pressure, to a limiting stop point, certain areas of the layer are compressed more than others. By appropriately establishing the pattern and depth of the limiting thrust of the recessed surface into a layer, and the pattern and depth of the recessed areas in the confining surface, selected areas can be compressed the most and rendered nonporous, while the remaining areas extending into the recesses of the die surface can be sintered in a porous structure.

A combination of these three methods can also be used.

At the transition zone between nonporous and porous areas stress concentrations may result in a weakened structure if the transition is too abrupt. The tamping and refilling procedure may be used to concentrate sufficient powder in the area to be made nonporous so that some of the material extends into the porous area, thereby providing a gradual transition from one area to the other and avoiding the weakening effect of stress concentration.

Figure 2:
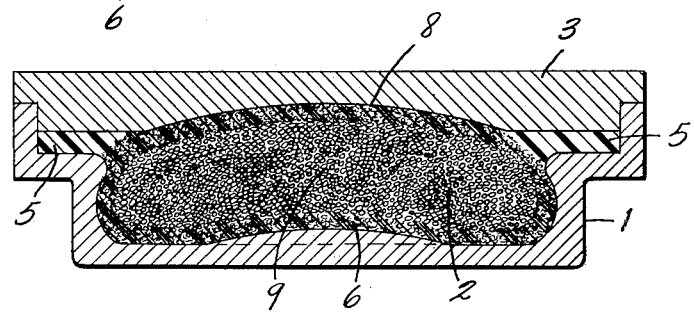
FIGURE 2 shows the sintered product in the mold.

FIGURES 1 and 2 of the drawings show the preparation of a bottle cap having porous and nonporous areas in accordance with the method just described, using a confining surface having a recessed portion conforming to the convex top of the cap. The mold 1 shown in FIGURES 1 and 2 is adapted to receive a layer 2 of particles of polyethylene. The upper plate 3 has a rim which conforms to the rim of the lower mold. When the mold is closed to the limiting stop point, as shown in FIGURE 2, the rim areas 5 of the layer 2 are compressed more than the central portion 6 of the layer. When the confining surfaces are brought together under application of heat sufficient to sinter the polyethylene at a pressure within the range from 30 to 100 p.s.i. the areas 5 become nonporous while the areas 6 remain porous, and the particles are sintered together to form the final cap. By using a rapid heating rate, only the surfaces 8 of the layer are sintered in the central portion 6 of the layer, and the particles in the center 9 of the layer remain nonsintered, and therefore loose. After cooling, the cap can be removed from the mold and it will then have the appearance shown in FIGURE 3.

Figure 4:
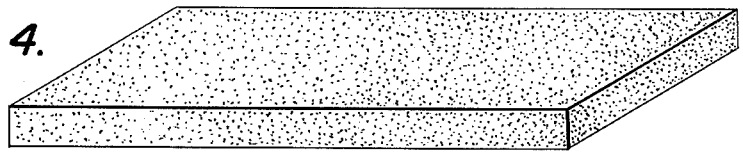
FIGURE 4 shows a flat porous plate product of the method.

If the entire article is to be porous, the upper and lower portions of the mold should be perfectly flat and parallel and the layer of uniform thickness, and as a result the layer during application of heat and pressure is subject to the same pressure throughout, and will remain porous uniformly throughout. A structure of this type, useful as a filter, is shown in FIGURE 4.

Figure 5:
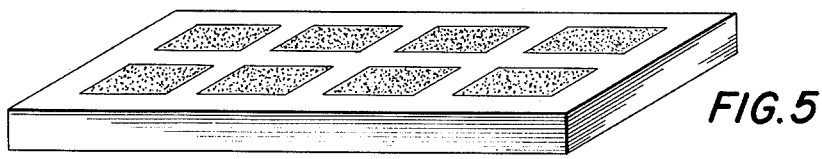
FIGURE 5 shows a flat plate with a grid of selected porous and non-porous areas.

A flat structure useful as a filter that has a grid of nonporous areas separating porous areas is obtained using waffle-shaped confining surfaces. This structure is shown in FIGURE 5.

The following examples, in the opinion of the inventors, illustrate the best embodiments of their invention:

EXAMPLES 1 TO 7

Seven bottle caps were prepared, four using powdered polyethylene (density 0.92) which passed a 50 mesh sieve and three using 100 mesh polyethylene. In preparing each cap the powder was distributed to a depth of 0.174 inch in a flat-bottomed female bottle-cap mold of stainless steel, 0.174 inch deep.

Figure 3:
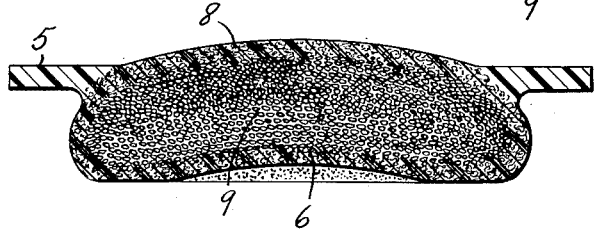
FIGURE 3 shows the bottle cap removed.

The mold was circular and the face of the male portion of the mold had a raised ridge portion extending all the way around the perimeter of the base, so that the perimeter of the layer would be compressed to a greater extent than the central portion, and, as shown in FIGURE 3, given a rim or flange 5 for gripping the bottle neck.

The top of the mold was brought down upon the layer of polyethylene at a pressure of either 30 or 50 p.s.i., and the mold brought to a temperature of 280 to 285° F. As the polyethylene softened, the top portion of the mold sank into its limiting position, and the layer was reduced to about two-fifths of the original layer's thickness. The layer was sintered while confined to the mold at this temperature for 60 minutes. The mold was then quenched and the cap removed.

The caps thus obtained were as shown in FIGURE 3 having a flanged rim of sintered nonporous material, a skin of sintered but porous material, and an interior of unsintered material. These caps could be fitted to a bottle filled with nonviscous fluid, such as after-shave lotion. When inverted, the cap filled with the fluid, which could be expressed from the cap by pressing the cap against a surface, such as the skin, even after the bottle had been tipped so that the body of fluid drained from the cap.

The caps were tested for tensile strength, pore size and fluid permeability. Maximum pore size was determined by bubble point measurement. The cap was immersed in ethyl alcohol until the pores were filled with alcohol. The cap then was placed in a jig and air applied to one side while a 1 mm. depth of alcohol was maintained on the other side. The bubble point was the air pressure in mm. necessary to cause the first bubble to appear on the alcohol side of the filter. The fluid permeability was determined by pressure drop of air through the filter. The flow of air was measured as standard cubic feet per hour per 0.8 square inch area, and converted to standard cubic feet per minute per square foot of filter area at 1 p.s.i. differential pressure.

The caps were found to have a satisfactory bubble point and fluid permeability. The tensile strength of the cap was such that it was impossible to tear it by hand.

Table I

| Example No. | 1 | 2 | 3 | 4 | 5 | 6 | 7 |
|---|---|---|---|---|---|---|---|
| Process Data: | | | | | | | |
|   Material size (mesh [1]) | 50 | 50 | 50 | 50 | 100 | 100 | 100 |
|   Pressure during sintering (p.s.i.) | 30 | 50 | 30 | 50 | 30 | 30 | 50 |
|   Sintering temperature (° F.) | 280–285 | 280–285 | 350 | 350 | 280–285 | 350 | 280–285 |
|   Sintering time, hr | 1 | 1 | 1 | 1 | 1 | 1 | 1 |
| Filter Data: | | | | | | | |
|   Depth of die and thickness of initial layer (inches) | 0.174 | 0.174 | 0.174 | 0.174 | 0.174 | 0.174 | 0.174 |
|   Approximate thickness of finished filter (inches) | 0.105 | 0.105 | 0.105 | 0.105 | 0.105 | 0.105 | 0.105 |

[1] Material passes through this mesh.

EXAMPLE 8

A group of filters were prepared exactly as set forth in Examples 1 to 7, using polyethylene which passed a 100 mesh sieve, and using a flat-bottomed female mold of stainless steel one inch deep. The male portion of the mold also had a flat surface. The top of the mold was brought down upon the layer of polyethylene at a pressure of 10 p.s.i. and the mold brought to a temperature of 325° F. As the polyethylene softened, the top portion of the mold sank into its limiting position and the layer was reduced to about one-half inch, one-half of the original layer of thickness. The layer was sintered while confined to the mold at this temperature for 60 minutes. The mold then was quenched and the filter removed. The filters obtained were flat discs of high tensile strength and satisfactory pore size and permeability, as determined by the bubble point and air flow tests of Examples 1 to 7.

By the process of the invention it is possible to produce bottle caps, filters and other porous articles having any desired size and dimensions. Expensive equipment is not required. The confining surfaces can be made of any desired configuration to impart a particular external shape.

Porous articles of uniform permeability and dimensions can be produced in successive batches. Articles in sheet-form are flexible and can be bent around small radii without damage. Because of the high chemical and heat resistance of polyethylene, the porous articles of the invention can be used with commercial acid and alkali solutions and solutions of various materials in most organic solvents.

Because of their greater strength, the articles having nonporous areas have special uses. The porous and nonporous areas can be at different levels and can have any desired shape. The raised or depressed areas can have any desired configuration, and can be a regular or irregular pattern, depending upon requirements. Filters of this type can be made in the form of matched pairs, in which the raised portions of the one filter interlock with recessed portions of the other filter, to hold them in position and define a channel therebetween so that filtered fluid entering the pair of filters at the flat surfaces thereof emerges into the central channel between the filters and can be collected in one stream. They can also be prepared in very large sizes. The nonporous areas can be made in the form of a gasket, to lock and seal the filter in position in the filtering equipment. The nonporous area can serve as an exterior and interior gasket so that a group of filters can be mounted on a central tube or in a system of concentric tubes.

A particularly advantageous use is in the form of reservoir caps for liquid containers or dispensers of various types, such as for instance for medicaments, lotions, shampoos and the like. Such caps can be made with a nonporous ridge of a configuration adapted to grip the neck of the bottle securely, and can have central portions that are porous and of sufficient thickness to provide a reservoir of fluid which is readily replenished by tipping the bottle. Fluid can be expressed from the cap, as desired upon the surface to be treated, simply by running it across the surface, aided by compressing it against the surface.

This application is a continuation-in-part of Serial No. 320,807, filed November 15, 1952, now Patent No. 2,819,209.

We claim:

1. A fluid-permeable article of low density polyethylene comprising interconnected aggregates of sintered polyethylene particles, the aggregates defining open spaces intercommunicating to define pores of microscopic dimensions extending from surface to surface and uniformly distributed from surface to surface of the article for flow therethrough of fluid, the article thereby constituting a mass uniform in porosity from surface to surface and having a high tensile strength and flow capacity relative to its voids content and pore size.

2. A fluid-permeable article in accordance with claim 1 in sheet form.

3. A fluid-permeable article of low density polyethylene comprising interconnected aggregates of sintered polyethylene particles, the aggregates in at least one portion of the article defining open spaces intercommunicating to define pores of microscopic dimensions extending from surface to surface and uniformly distributed from surface to surface of the article for flow therethrough of fluid, thereby constituting a porous portion uniform in porosity from surface to surface and having a high tensile strength and flow capacity relative to its voids content and pore size, and the aggregates in other portions of the article being united in a nonporous structure.

4. A fluid-permeable article in accordance with claim 3 in sheet form.

5. A fluid-permeable article of low density polyethylene comprising surfaces composed of a network of interconnected aggregates of sintered polyethylene particles, the aggregates in said surfaces defining open spaces intercommunicating throughout the surface to define pores of microscopic dimensions extending from one side of the surface to the other and uniformly distributed therethrough for flow therethrough of fluid, the said surfaces completely enclosing and confining free-flowing polyethylene particles.

6. A fluid-permeable article in accordance with claim 5 in sheet form.

7. A process for preparing a fluid-permeable article of low density polyethylene which comprises sintering a layer of particles of polyethylene while confining the layer between inert nonadhering surfaces under a pressure within the range from about 10 to about 50 p.s.i. at a temperature above the softening temperature and below the melting and decomposition temperatures of the particles.

8. A process in accordance with claim 7 in which the temperature is within the range from about 225° to about 350° F.

9. A process of preparing a fluid-permeable article of low density polyethylene which is nonporous in selected portions, which comprises sintering a nonuniformly dense layer of particles of polyethylene, said layer having a higher particle density in the areas which are to be nonporous, while confining the layer between inert nonadhering surfaces under a pressure within the range from about 10 to about 50 p.s.i. at a temperature above the softening temperature and below the melting and decomposition temperatures of the particles.

10. A process of preparing a fluid-permeable article of low density polyethylene which is nonporous in selected portions, which comprises forming a layer of particles of polyethylene, tamping selected areas of the layer which are to be nonporous, adding additional particles to the tamped areas to increase the particle density thereof, and then sintering the layer while confining it between inert nonadhering surfaces under a pressure within the range of about 10 to about 50 p.s.i. at a temperature above the softening temperature and below the melting and decomposition temperatures of the particles.

11. A process of preparing a fluid-permeable article of low density polyethylene which is nonporous in selected portions, which comprises sintering a nonuniformly thick layer of particles of polyethylene, said layer having a greater thickness in the areas which are to be nonporous, while confining the layer between inert nonadhering surfaces under a pressure within the range of about 10 to about 50 p.s.i. at a temperature above the softening temperature and below the melting and decomposition temperatures of the particles, and reducing the depth of the areas having a greater thickness until they are nonporous by application of such pressure.

12. A process of preparing a fluid-permeable article of low density polyethylene which is nonporous in selected portions, which comprises sintering a layer of particles of polyethylene while confining the layer between inert nonadhering surfaces provided with raised and with recessed portions under a pressure within the range from about 10 to about 50 p.s.i. at a temperature above the softening temperature and below the melting and decomposition temperatures of the particles, the pressure being sufficient to reduce the layer to a predetermined thickness, the portions of the layer confined within the recesses of the surface during sintering being sintered to a porous network of interconnected aggregates and the portions beneath the raised portions being sintered to a nonporous mass.

13. A container cap having a fluid-permeable portion opening to the contents of a container formed of low density polyethylene comprising surfaces composed of a network of interconnected aggregates of sintered polyethylene particles, the aggregates in said surfaces defining open spaces intercommunicating throughout the surface to define pores of microscopic dimensions extending from one side of the surface to the other and uniformly distributed therethrough for flow therethrough of fluid, the said surfaces completely enclosing and confining free-flowing polyethylene particles.

References Cited in the file of this patent

UNITED STATES PATENTS

| | | |
|---|---|---|
| 664,782 | Rittershausen | Dec. 25, 1900 |
| 2,256,483 | Johnston | Sept. 23, 1941 |
| 2,297,248 | Rudolph | Sept. 29, 1942 |
| 2,400,091 | Alfthan | May 14, 1946 |
| 2,482,062 | Hanson | Sept. 13, 1949 |
| 2,573,639 | Coler | Oct. 30, 1951 |
| 2,732,078 | Records | Jan. 24, 1956 |
| 2,744,291 | Stastny | May 8, 1956 |
| 2,745,141 | Brennan | May 15, 1956 |
| 2,783,894 | Lovell | Mar. 5, 1957 |
| 2,819,209 | Pall | Jan. 7, 1958 |

FOREIGN PATENTS

| | | |
|---|---|---|
| 627,856 | Great Britain | Aug. 17, 1949 |

OTHER REFERENCES

Synthetic Resins and Allied Plastics, edited by Morrell and Langton, Oxford University Press, N.Y., 1951, pages 202–205.